United States Patent [19]

Prior et al.

[11] Patent Number: 5,263,444
[45] Date of Patent: Nov. 23, 1993

[54] SEAL, AND SEALED T-JOINT

[75] Inventors: Gregory P. Prior, Birmingham; Steven P. Bittner, Westland; Mark S. Blodgett, Sterling Heights, all of Mich.

[73] Assignee: General Motors Corporation, Detroit, Mich.

[21] Appl. No.: 29,519

[22] Filed: Feb. 16, 1993

[51] Int. Cl.⁵ .................................. F02F 7/00
[52] U.S. Cl. ................. 123/195 R; 277/235 B
[58] Field of Search ............. 123/195 R, 198 E; 277/235 B

[56] References Cited

U.S. PATENT DOCUMENTS 4,928,980  5/1990  Deuring .................. 123/198 E

Primary Examiner—Noah P. Kamen
Attorney, Agent, or Firm—Charles K. Veenstra

[57] ABSTRACT

A seal for the T-joint between upper and lower engine crankcase members and a crankshaft seal member has a longitudinal portion received between and engaging the upper and lower crankcase members, and a generally triangular tip formed by a shorter side and a longer side with the shorter side facing toward the crankshaft seal member as the crankshaft seal member is installed. The tip deforms as the crankshaft member is installed, and thereby seals the T-joint.

3 Claims, 2 Drawing Sheets

SEAL, AND SEALED T-JOINT

TECHNICAL FIELD

This invention relates to sealing of a T-joint between first and second members having mating surfaces engageable by movement perpendicular to the mating surfaces, and a third member engageable with a common lateral surface of the first two members by movement parallel to the lateral surface.

BACKGROUND

The T-joint formed by upper and lower crankcase members and a crankshaft seal member is difficult to seal. The upper and lower crankcase members have mating surfaces that move perpendicular to one another as the crankcase members are assembled, and a seal between the crankcase members is readily compressed during that process. However, as the crankshaft seal member is assembled to the crankcase members, it moves parallel to the common lateral cylindrical surface defined by the assembled crankcase members; thus a seal projecting from between the crankcase members to engage the crankshaft seal member is subjected to shear forces by the crankshaft seal member.

SUMMARY OF THE INVENTION

This invention provides an improved seal suitable for use in such a T-joint, and an improved T-joint incorporating the improved seal.

In a seal incorporating this invention, a longitudinal portion is adapted to be received between and engage the upper and lower crankcase members, and a generally triangular tip is adapted to be received in a recess between the crankcase members and extend beyond the common lateral surface defined by the crankcase members. The tip is formed by a shorter side and a longer side with the shorter side facing generally toward the crankshaft seal member as the crankshaft seal member is moved toward engagement with the lateral surface; with such a construction, the tip will be deformed as the crankshaft seal member is moved toward engagement with the lateral surface and thereby seal the T-joint between the upper and lower crankcase members and the crankshaft seal member.

The improved T-joint incorporating this invention comprises first and second members having mating surfaces engageable by movement perpendicular to the mating surfaces. The engaged members further define a common lateral surface and a recess between the engaged members opening from the lateral surface. A third member has a surface engageable with the lateral surface by movement parallel to the lateral surface, and the resulting intersection between the first, second and third members defines the T-joint. The T-joint includes a seal having a longitudinal portion received between and engaging the first and second members, and a generally triangular tip received in the recess and extending beyond the lateral surface. The tip is formed by a shorter side and a longer side with the shorter side facing generally toward the third member as the third member is moved toward engagement with the lateral surface. The tip is deformed as the third member is moved toward engagement with the lateral surface and thereby seals the T-joint.

The details as well as other features and advantages of a preferred embodiment of this invention are set forth in the remainder of the specification and are shown in the accompanying drawings.

SUMMARY OF THE INVENTION

DETAILED DESCRIPTION

Figure 1:
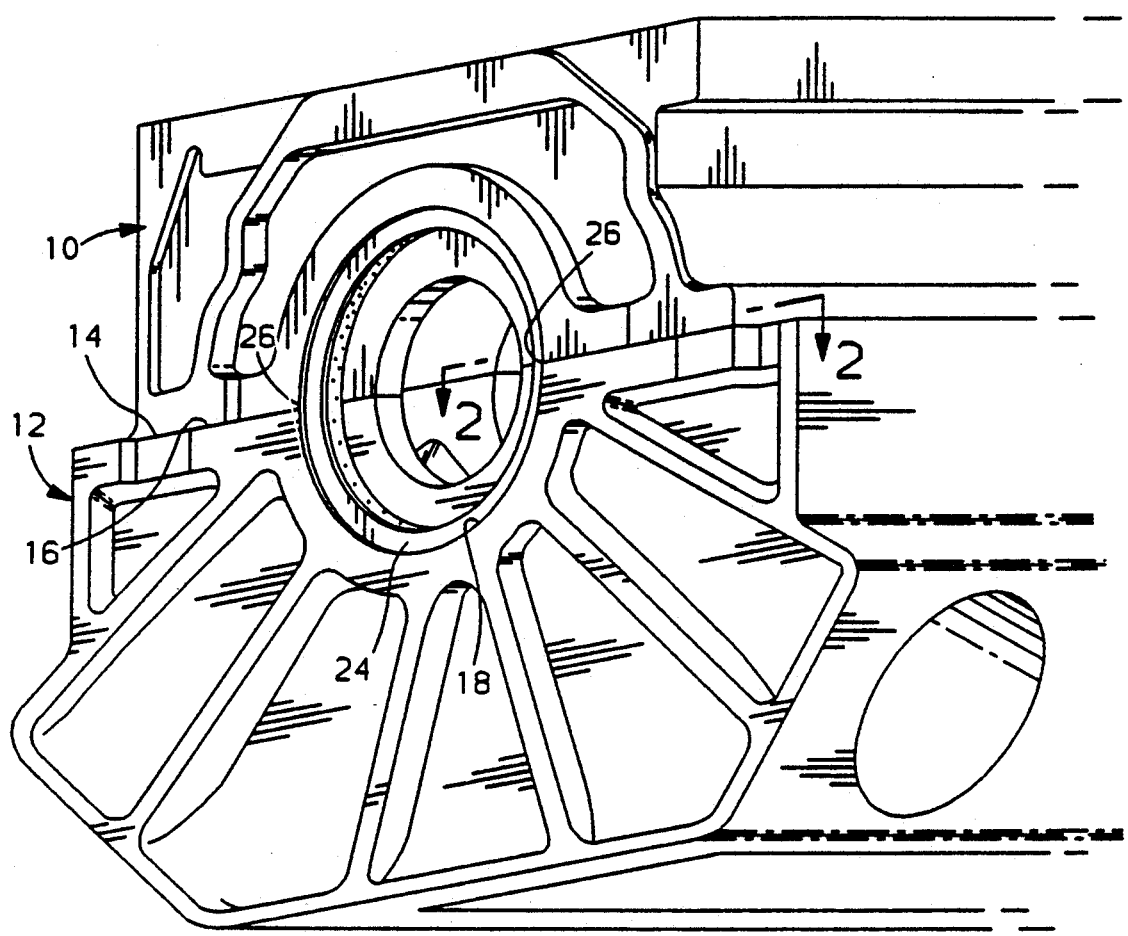
FIG. 1 is an end view of an engine showing the sealed T-joints.
Figure 2:
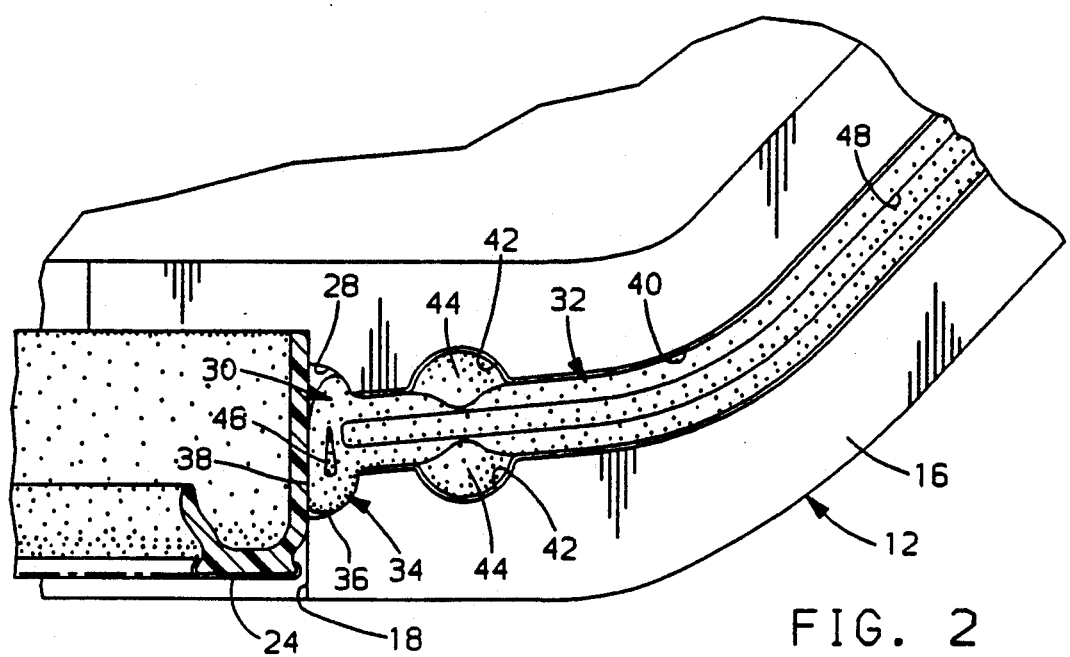
FIG. 2 is a view indicated by line 2—2 of FIG. 1 showing the T-joint seal engaging the crankshaft seal member.
Figure 3:
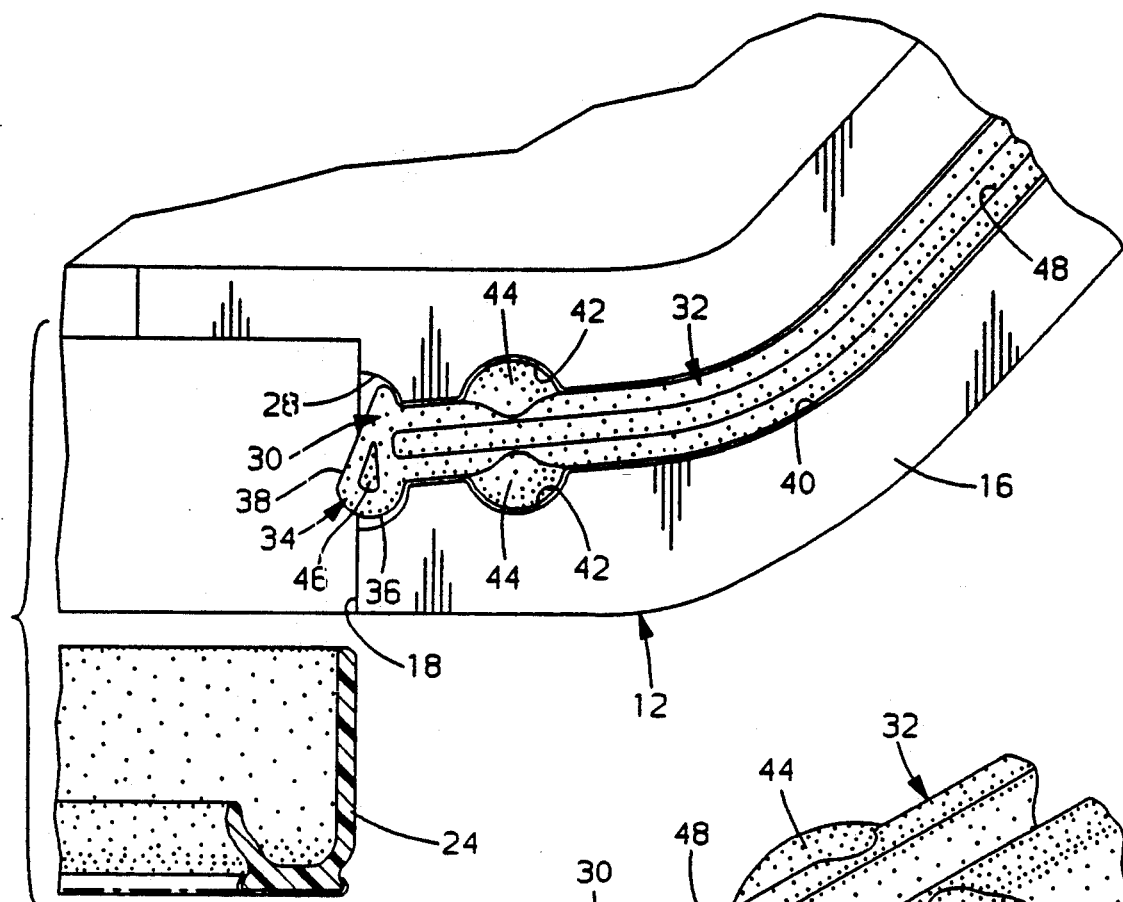
FIG. 3 is a view similar to FIG. 2 showing the T-joint seal prior to assembly of the crankshaft seal member to the upper and lower crankcase members.
Figure 4:
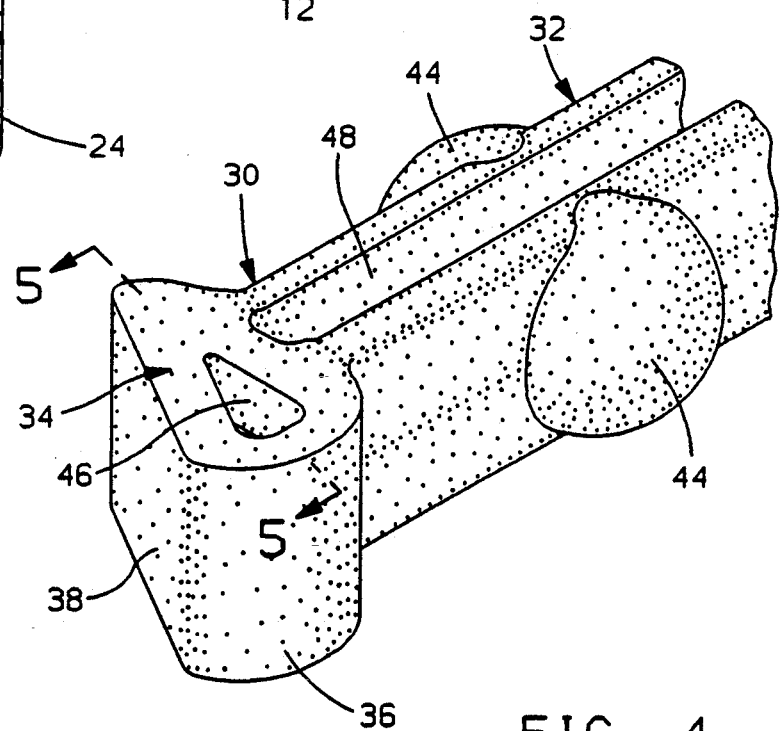
FIG. 4 is an enlarged view of the T-joint seal showing details of the seal tip.
Figure 5:
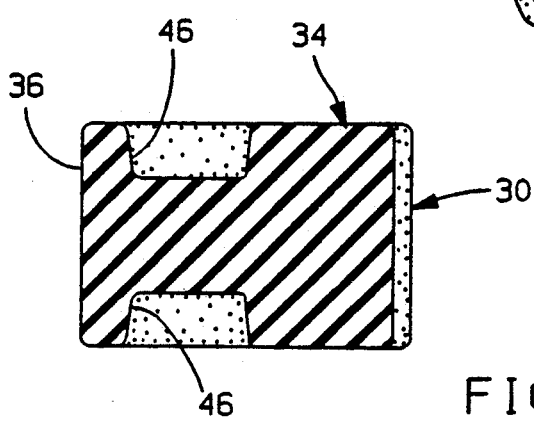
FIG. 5 is a sectional view along line 4—4 of FIG. 4 showing additional details of the seal tip.

Referring to the drawings, an engine has upper and lower crankcase members 10 and 12 with mating surfaces 14 and 16. Crankcase members 10 and 12 are assembled by movement perpendicular to surfaces 14 and 16. When assembled, crankcase members 10 and 12 define a common lateral cylindrical surface 18.

A crankshaft seal member 24 is assembled to crankcase members 10 and 12 by movement parallel to lateral surface 18. Crankshaft seal member 24 has a configuration suitable for sealing between lateral surface 18 and a crankshaft (not shown).

The intersections between upper and lower crankcase members 10 and 12 and crankshaft seal member 24 define T-joints 26. Each T-joint 26 includes a recess 28 between upper and lower crankcase members 10 and 12, opening toward lateral surface 18.

Each T-joint 26 has a seal 30 with a longitudinal portion 32 received between and engaging upper and lower crankcase members 10 and 12. Each seal 30 further includes a generally triangular tip 34 received in a recess 28 and extending beyond lateral surface 18. Each tip 34 is formed by a shorter side 36 and a longer side 38 with the shorter side facing generally toward crankshaft seal member 24 as crankshaft seal member 24 is assembled to crankcase members 10 and 12. Tips 34 are deformed as crankshaft seal member 24 slides across lateral surface 18 and thereby seal T-joints 26.

The longitudinal portions 32 of seals 30 are received in grooves 40 extending from recesses 28 and formed in the mating surfaces 14 and 16 of upper and lower crankcase members 10 and 12. Grooves 40 have lateral enlargements 42, and the longitudinal portions 32 of seals 30 have lateral protrusions 44 received in enlargements 42 to anchor seals 30 in place.

Seals 30 have upper and lower recesses 46 in tips 34, and upper and lower grooves 48 in longitudinal portions 32, which enhance engagement between seals 30 and upper and lower crankcase members 10 and 12.

The embodiments of the invention in which an exclusive property or privilege is claimed are defined as follows:

1. An engine with sealed T-joints and comprising upper and lower crankcase members having mating surfaces engageable by movement perpendicular to said surfaces, said members further defining a common lateral cylindrical surface and a pair of recesses between said members opening from said lateral surface, a crankshaft seal member having a surface engageable with said lateral surface by movement parallel to said lateral surface, the intersections between said upper and lower crankcase members and said crankshaft seal member constituting said T-joints, and seals for said T-joints, each said T-joint seal having a longitudinal portion received between and engaging said upper and lower crankcase members, each said seal further having a generally triangular tip received in said recess and extending beyond said lateral surface, and wherein each of said tips is formed by a shorter side and a longer side with said shorter side facing generally toward said crankshaft seal member as said crankshaft seal member is moved toward engagement with said lateral surface and said longer side seals against said crankshaft seal member, whereby said tips are deformed as said crankshaft seal member is moved toward engagement with said lateral surface and thereby seal said T-joints.

2. A seal for a T-joint between first and second members having mating surfaces engageable by movement perpendicular to said surfaces, said members further defining a common lateral surface and a recess between said members opening from said lateral surface, a third member having a surface engageable with said lateral surface by movement parallel to said lateral surface, the intersection between said first, second and third members constituting said T-joint, said seal comprising a longitudinal portion adapted to be received between and engage said first and second members, said seal further comprising a generally triangular tip adapted to be received in said recess and extend beyond said lateral surface, and wherein said tip is formed by a shorter side and a longer side with said shorter side facing generally toward said third member as said, third member is moved toward engagement with said lateral surface and said longer side seals against said third member, whereby said tip will be deformed as said third member is moved toward engagement with said lateral surface and thereby seal said T-joint.

3. A sealed T-joint comprising first and second members having mating surfaces engageable by movement perpendicular to said surfaces, said members further defining a common lateral surface and a recess between said members opening from said lateral surface, a third member having a surface engageable with said lateral surface by movement parallel to said lateral surface, the intersection between said first, second and third members constituting said T-joint, and a seal for said T-joint, said seal having a longitudinal portion received between and engaging said first and second members, said seal further having a generally triangular tip received in said recess and extending beyond said lateral surface, and wherein said tip is formed by a shorter side and a longer side with said shorter side facing generally toward said third member as said third member is moved toward engagement with said lateral surface and said longer side seals against said third member, whereby said tip is deformed as said third member is moved toward engagement with said lateral surface and thereby seals said T-joint.

* * * * *